(12) United States Patent
Hong

(10) Patent No.: US 12,317,204 B2
(45) Date of Patent: May 27, 2025

(54) TIME SYNCHRONIZATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 17/791,831

(22) PCT Filed: Jan. 10, 2020

(86) PCT No.: PCT/CN2020/071496
§ 371 (c)(1),
(2) Date: Jul. 8, 2022

(87) PCT Pub. No.: WO2021/138910
PCT Pub. Date: Jul. 15, 2021

(65) Prior Publication Data
US 2023/0059797 A1    Feb. 23, 2023

(51) Int. Cl.
*H04W 56/00* (2009.01)
*H04J 3/06* (2006.01)

(52) U.S. Cl.
CPC ......... *H04W 56/001* (2013.01); *H04J 3/0661* (2013.01)

(58) Field of Classification Search
CPC ............. H04W 56/0015; H04W 56/00; H04W 74/0891; H04J 3/0661; H04L 9/12; H04L 43/12
See application file for complete search history.

(56) References Cited

U.S. PATENT DOCUMENTS

| | | | |
|---|---|---|---|
| 2005/0068928 A1* | 3/2005 | Smith | H04W 48/16 370/338 |
| 2005/0128988 A1 | 6/2005 | Simpson et al. | |
| 2013/0223458 A1 | 8/2013 | Bui | |
| 2015/0117364 A1* | 4/2015 | Asterjadhi | H04L 5/003 370/329 |
| 2015/0249953 A1* | 9/2015 | Kim | H04W 48/14 370/254 |
| 2015/0351018 A1* | 12/2015 | Kim | H04W 48/16 370/338 |
| 2016/0037477 A1* | 2/2016 | Cheng | G01S 5/0045 455/456.1 |

FOREIGN PATENT DOCUMENTS

CN    108988973 A    12/2018

OTHER PUBLICATIONS

European Patent Application No. 20912460.1, Search and Opinion dated Dec. 8, 2022, 7 pages.
PCT/CN2020/071496, English translation of International Search Report dated Sep. 28, 2020, 2 pages.

* cited by examiner

*Primary Examiner* — Yee F Lam
(74) *Attorney, Agent, or Firm* — Cozen O'Connor

(57) ABSTRACT

A method for time synchronization includes: receiving a message carrying time synchronization function information, the time synchronization function information being used for time synchronization of a station and an access point under multiple links; and controlling the time synchronization of the station and the access point under the multiple links by using the time synchronization function information.

12 Claims, 4 Drawing Sheets

TIME SYNCHRONIZATION METHOD AND APPARATUS

CROSS-REFERENCE TO RELATED APPLICATION

This application is the US national phase application of International Application No. PCT/CN2020/071496, filed on Jan. 10, 2020, the entire contents of which are incorporated herein by reference for all purposes.

TECHNICAL FIELD

The disclosure relates to the technical field of communication, and in particular to a method and an apparatus for time synchronization, a terminal, an access point device and a storage medium.

BACKGROUND

In the new Wireless Fidelity (Wi-Fi) standard, aggregation of multiple frequency bands can be achieved between a station and an access point. Aggregation of multiple frequency bands refers to simultaneous transmission of data in multiple frequency bands (2.4 GHz, 5 GHz, and 6-7 GHz) to improve transmission efficiency.

SUMMARY

According to an aspect of embodiments of the present disclosure, a method for time synchronization is provided. The method includes:

receiving a message carrying time synchronization function information, wherein the time synchronization function information is configured for time synchronization between a station and an access point under a plurality of links;

controlling the time synchronization between the station and the access point under the plurality of links by using the time synchronization function information.

According to another aspect of embodiments of the present disclosure, a method for time synchronization is provided. The method includes:

generating a message carrying time synchronization function information, wherein the time synchronization function information is configured for time synchronization between a station and an access point under a plurality of links; and sending the message.

According to another aspect of embodiments of the present disclosure, a terminal is provided. The terminal includes: a processor; and a memory, configured to store instructions executable by the processor, wherein the processor is configured to implement the method for time synchronization described above by loading and executing the executable instructions.

According to another aspect of embodiments of the present disclosure, an access point device is provided. The access point device includes: a processor; and a memory, configured to store instructions executable by the processor, wherein the processor is configured to implement the method for time synchronization described above by loading and executing the executable instructions.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
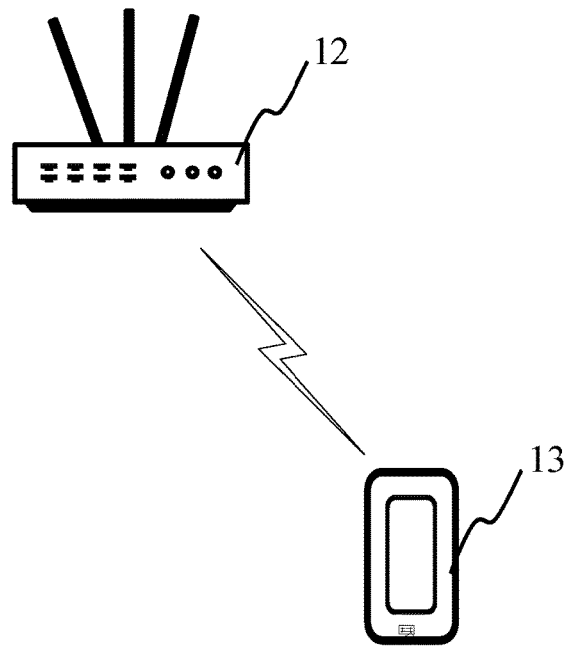
FIG. 1 shows a schematic diagram of a communication system provided by an exemplary embodiment of the present disclosure.

FIG. 1 shows a block diagram of a communication system provided by an exemplary embodiment of the present disclosure. As shown in FIG. 1, the communication system may include: an access point device 12 (referred to as an access point (AP)) and a terminal 13 (also referred to as a station (STA)).

The terminal 13 may include various handheld devices with wireless communication functions, vehicle-mounted devices, wearable devices, computing devices or other processing devices connected to the wireless modem, as well as various forms of user equipment, mobile stations (MS), terminal and so on. For the convenience of description, the devices mentioned above are collectively referred to as terminals.

The access point device 12 referred to in this disclosure is an access point of a Wi-Fi network, such as a wireless router, a gateway and other devices. The terminal 13 wirelessly accesses the access point device 12 to realize wireless transmission.

Multiple links can be established between the terminal 13 and the access point device 12 in multiple frequency bands (e.g., 2.4 GHz, 5 GHz, and 6-7 GHz) at the same time, so as to realize Multi-Link Aggregation (MLA), making the speed and throughput of the WIFI network doubled, which can be used in video transmission, augmented reality (AR), virtual reality (VR) and other scenarios.

In the relevant Wi-Fi standard, the method for the station to maintain time synchronization with the access point is to listen to time synchronization function (TSF) information in the beacon frame broadcasted by the access point to update its own clock, so as to achieve synchronization. However, in the relevant Wi-Fi standard, there is only a time synchronization mechanism under a single link, which cannot meet the time synchronization requirements under multiple links.

The communication system and service scenarios described in the embodiments of the present disclosure are for the purpose of illustrating the technical solutions of the embodiments of the present disclosure more clearly, and do not constitute a limitation on the technical solutions provided by the embodiments of the present disclosure. Those of ordinary skill in the art know that with the evolution of communication systems and the emergence of new service scenarios, the technical solutions provided by the embodiments of the present disclosure are also applicable to similar technical problems.

Figure 2:
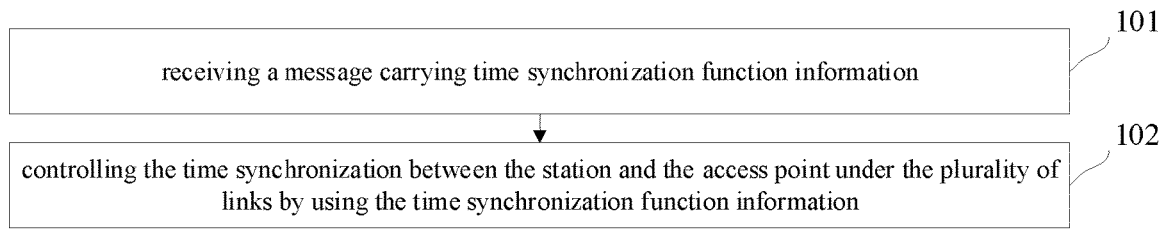
FIG. 2 is a flowchart of a method for time synchronization according to an exemplary embodiment.

FIG. 2 is a flowchart of a method for time synchronization according to an exemplary embodiment. Referring to FIG. 2, the method includes the following steps.

In step 101, the terminal receives a message carrying time synchronization function information.

Here, the time synchronization function information is configured for time synchronization between the station and the access point under multiple links.

As mentioned earlier, links between the station and the access point can be established on multiple frequency bands at the same time. In order to ensure that the station can be in time synchronization with the access point under each link, the access point sends the message carrying the time synchronization function information to the station, so that the station can realize time synchronization under multiple links based on the message.

In step 102, the time synchronization between the station and the access point under multiple links is controlled by using the time synchronization function information.

Here, the time synchronization between the station and the access point under multiple links means that for these multiple links, the station and the access point are time synchronized on the same link, so that the station and the access point are time synchronized in each link.

The station can maintain a clock for each link, and the station updates the clock corresponding to each link based on the time synchronization parameters, so as to realize the time synchronization with the access point.

In the embodiment of the present disclosure, the access point sends the time synchronization function information to the station by carrying the time synchronization function information in the message, and the station can realize the time synchronization between the station and the access point under multiple links through the time synchronization function information, which ensures normal transmission between the station and the access point on each link. It solves the problem that the synchronization method of a single link in the related art is not suitable for a multi-link scenario.

Optionally, the time synchronization function information includes a plurality of timestamps respectively corresponding to the plurality of links.

In this implementation, the time synchronization function information includes a plurality of timestamps corresponding to the plurality of links, so that the station can update the clocks of respective links based on the plurality of timestamps corresponding to the plurality of links, thereby completing the time synchronization of each link.

Optionally, controlling the time synchronization between the station and the access point under the plurality of links by using the time synchronization function information includes:

in response to a first link and the second link in the plurality of links performing information transmission in an asynchronous transmission mode, controlling the time synchronization between the station and the access point under the first link and the second link respectively by using two timestamps corresponding to the first link and the second link in the time synchronization function information.

In this implementation, the time synchronization between the station and the access point under the first link and the second link is realized through the timestamps in the time synchronization function information, which ensures the normal data transmission between the station and the access point on the first link and the second link.

Optionally, the method further includes:

in response to a third link and a fourth link in the plurality of links performing information transmission in a synchronous transmission mode, controlling the time synchronization between the station and the access point under the third link and the fourth link by using the timestamp used in a process of associating the station with the access point.

In this implementation, when synchronous transmission is required, data under these links for synchronous transmission needs to be sent at the same time or arrive at the receiver at the same time. In this case, the timestamp in the time synchronization parameter used when the station and the access point are associated can be used. Although there are multiple links between the station and the access point, in the process of the station to access the network, one of the links is used to associate with the access point, and only the timestamp in the time synchronization parameter obtained during the association process is used, so that the operation is simple, the station only needs to maintain a set of time synchronization parameters, and it can also ensure the normal data transmission between the station and the access point on these synchronous transmission links.

Optionally, controlling the time synchronization between the station and the access point under the plurality of links by using the time synchronization function information includes:

updating clocks corresponding to the plurality of links by using the time synchronization function information.

Here, the time synchronization function information is used to update the clocks corresponding to the multiple links, that is, the clocks are updated by the timestamps.

Optionally, the clocks corresponding to the plurality of links include:

identifiers and corresponding timestamps of respective links in the plurality of links.

In this implementation, in addition to the timestamp, the clock of each link needs to be identified with the identifier of the link, so as to distinguish the clocks of multiple links.

Optionally, the identifier of the link includes a first group of consecutive bits and a second group of consecutive bits, the first group of consecutive bits represents a number of the link, and the second group of consecutive bits represents a bandwidth of the link.

In this implementation, with the identifier of the link in this manner, it can ensure the normal distinction of each link. For example, an 8-bit identifier may be used, wherein the upper 2 bits represent the number of the link, and the lower 6 bits represent the bandwidth of the link.

Furthermore, the multiple links may also be a basic service set (BSS) composed of the same channel bandwidth or different channel bandwidths under the same frequency band, or a basic service set (BSS) composed of the same bandwidth or different bandwidths under different frequency bands, for example, a BBS with three bandwidths of 20 MHz in the 2.4 GHz frequency band.

Optionally, receiving the message carrying time synchronization function information includes:

receiving a beacon frame or a probe response frame, wherein the beacon frame or the probe response frame carries the message.

The time synchronization function information is transmitted by the Beacon frame or the Probe Response frame, which is convenient to implement.

It should be noted that the foregoing steps 101-102 and the foregoing optional steps may be combined arbitrarily.

Figure 3:
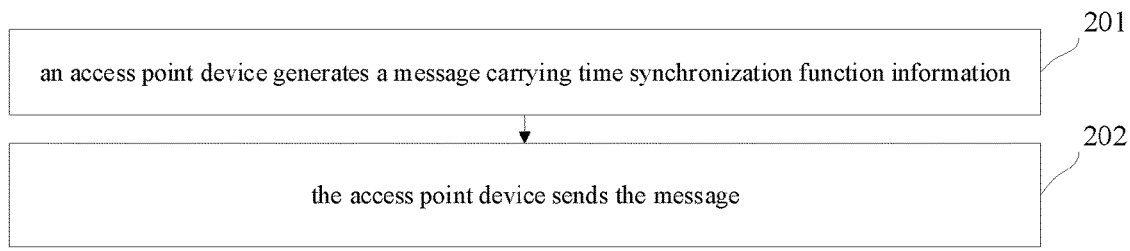
FIG. 3 is a flowchart of a method for time synchronization according to an exemplary embodiment.

FIG. 3 is a flowchart of a method for time synchronization according to an exemplary embodiment. Referring to FIG. 3, the method includes the following steps.

In step 201, the access point device generates a message carrying time synchronization function information.

Here, the time synchronization function information is used for time synchronization between the station and the access point under multiple links.

In the embodiment of the present disclosure, the access point device determines the timestamps of respective links based on the maximum range covered by each link, and generates the time synchronization function information based on the determined timestamps of respective links.

In step 202, the access point device sends a message.

The access point sends this message to the station, to send the time synchronization function information to the station. When the access point is connected to multiple stations, the message can be sent to each station separately.

In the embodiment of the present disclosure, the access point sends the time synchronization function information to the station by carrying the time synchronization function information in the message, and the station can realize the time synchronization between the station and the access point under multiple link through the time synchronization function information, which ensures normal transmission between the station and the access point on each link. It solves the problem that the synchronization method of a single link in the related art is not suitable for a multi-link scenario.

Optionally, sending the message includes:

sending a beacon frame or a probe response frame, wherein the beacon frame or the probe response frame carries the message.

It should be noted that the foregoing steps 201-202 and the foregoing optional steps may be combined arbitrarily.

Figure 4:
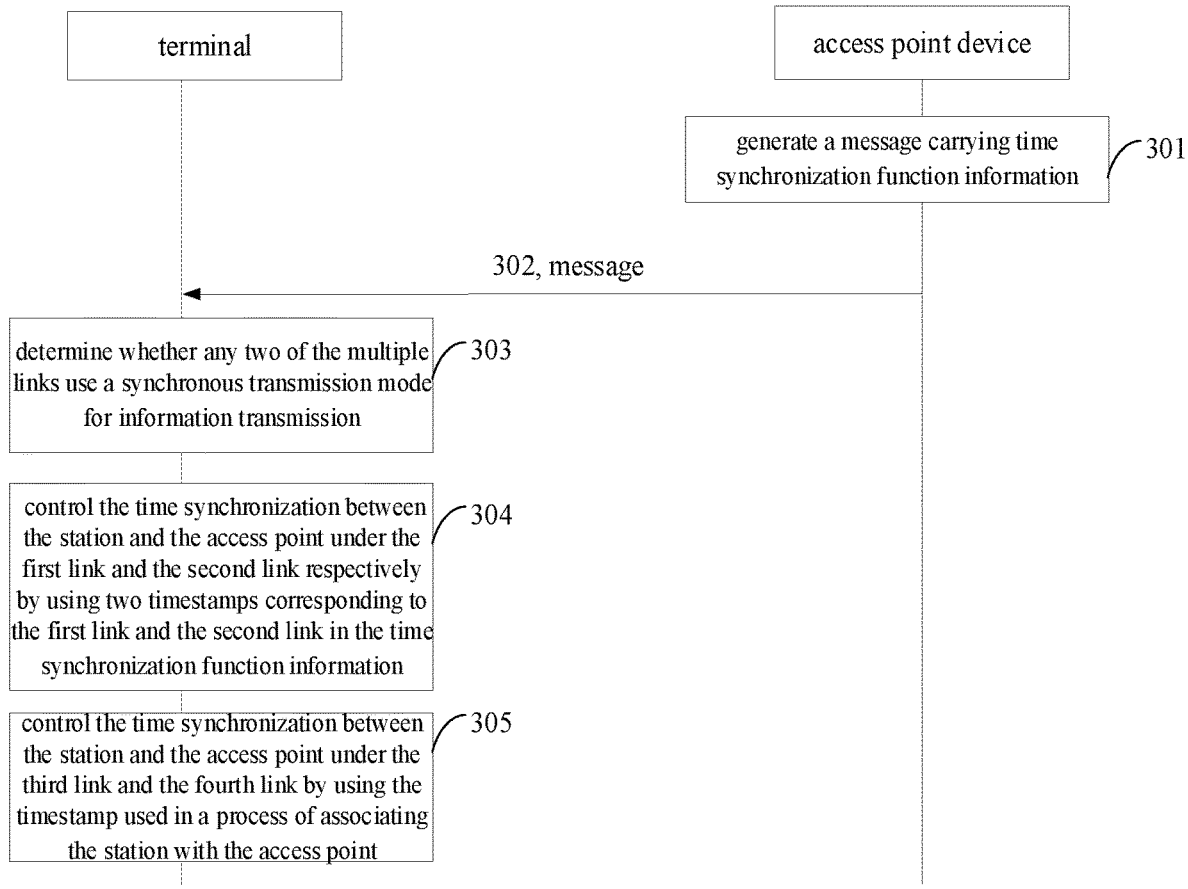
FIG. 4 is a flowchart of a method for time synchronization according to an exemplary embodiment.

FIG. 4 is a flowchart of a method for time synchronization according to an exemplary embodiment. Referring to FIG. 4, the method includes the following steps.

In step 301, the access point device generates a message carrying time synchronization function information.

Here, the time synchronization function information is used for time synchronization between the station and the access point under multiple links.

Optionally, the time synchronization function information includes multiple timestamps corresponding to multiple links respectively.

For the manner in which the access point device generates the time synchronization function information, reference may be made to step 201, which will not be repeated here.

In step 302, the access point device sends the message. The terminal receives the message carrying the time synchronization function information.

In the embodiment of the present disclosure, the access point device sends the beacon frame or the probe response frame; the terminal receives the beacon frame or the probe response frame. The beacon frame or the probe response frame carries the message.

In step 303, the terminal determines whether any two of the multiple links use a synchronous transmission mode for information transmission.

The terminal determines whether to transmit in a synchronous mode according to the service to be transmitted, the purpose of multi-band transmission, or the communication environment under each link, where the communication environment refers to a probability of a communication conflict occurring within a certain period of time under each link. For example, the terminal needs to transmit the same data on multiple links at the same time to ensure the success rate of transmission. In this case, the synchronous transmission mode can be used for information transmission. Of course, this is just an example, and whether the synchronous or asynchronous transmission mode is actually used can be defined as needed.

In step 304, in response to the first link and the second link in the multiple links performing information transmission in the asynchronous transmission mode, the terminal controls the time synchronization between the station and the access point under the first link and the second link respectively by using two timestamps corresponding to the first link and the second link in the time synchronization function information.

Figure 5:
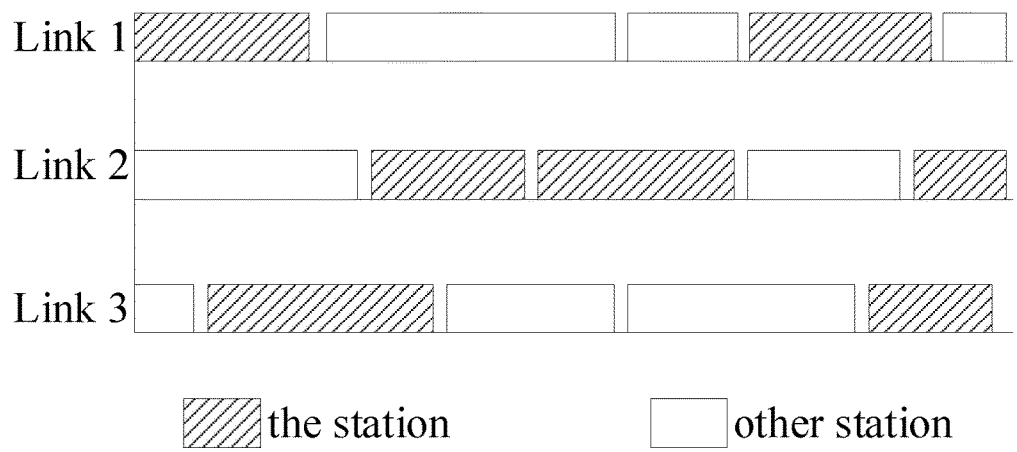
FIG. 5 is a schematic diagram of an asynchronous transmission mode according to an exemplary embodiment.

FIG. 5 is a schematic diagram of an asynchronous transmission (Independent) mode according to an exemplary embodiment. Referring to FIG. 4, the transmission of this station on respective links is not synchronized. In this case, the terminal may update the clock of each link by using the timestamp corresponding to each link in the time synchronization function information.

In step 305, in response to a third link and a fourth link in the multiple links performing information transmission in a synchronous transmission mode, the terminal controls the time synchronization between the station and the access point under the third link and the fourth link by using the timestamp used in a process of associating the station with the access point.

Figure 6:
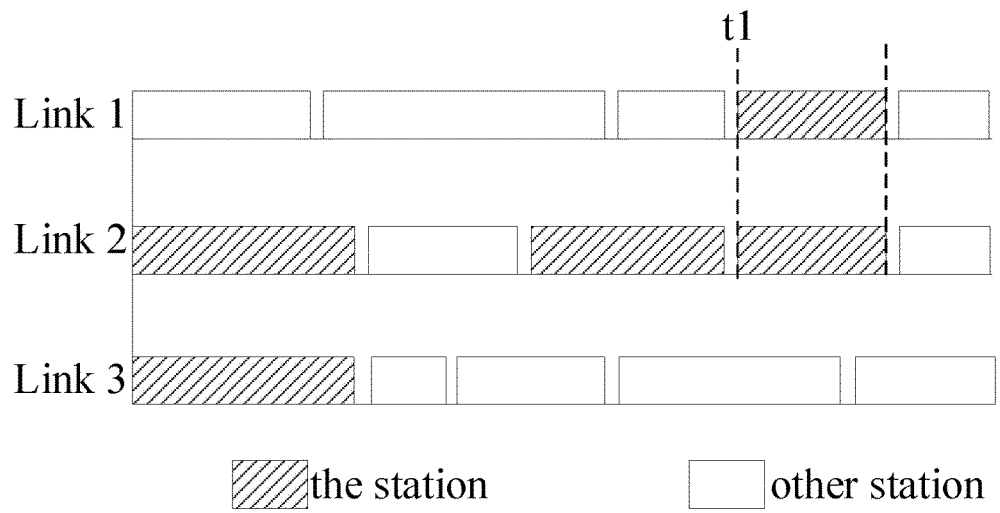
FIG. 6 is a schematic diagram of a synchronous transmission mode according to an exemplary embodiment.

FIG. 6 is a schematic diagram of a synchronous transmission (Dependent) mode according to an exemplary embodiment. Referring to FIG. 6, this station starts synchronous transmission on link 1 and link 2 from time t1. In this case, the terminal can use the timestamp used during the association process between the station and the access point (the timestamp is continuously maintained by the terminal after the association is completed, that is, it is always updated over time) to update the clocks of link 1 and link 2. However, the clock of link 3 is still updated with the timestamp corresponding to link 3 in the time synchronization function information.

In this case, if there are links for synchronous transmission, the terminal can also notify the access point device of the identifiers of the links for synchronous transmission, so that the access point device also uses the timestamp used in the association process to perform time synchronization of these links.

In this embodiment of the present disclosure, the terminal may use the time synchronization function information to update clocks corresponding to multiple links.

Here, the clocks corresponding to the multiple links include: identifiers of respective links of the multiple links and corresponding timestamps. In this implementation, in addition to the timestamp, the clock of each link needs to be identified with a link identifier, so as to distinguish the clocks of multiple links.

Figure 7:
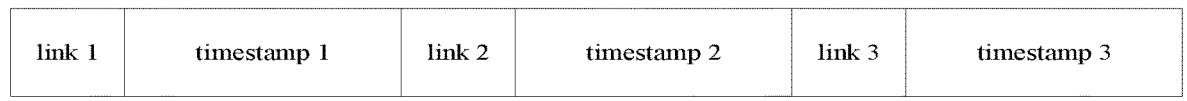
FIG. 7 is a schematic diagram of clocks corresponding to a plurality of links according to an exemplary embodiment.

FIG. 7 is a schematic diagram showing clocks corresponding to a plurality of links according to an exemplary embodiment. Referring to FIG. 7, the identifier of each link corresponds to a timestamp. During the process of maintaining the clock of each link, the identifier of the link remains unchanged, and the timestamp changes with time.

Figure 8:
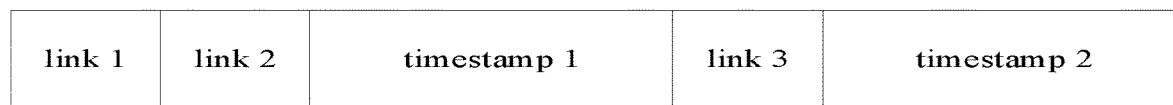
FIG. 8 is a schematic diagram of clocks corresponding to a plurality of links according to an exemplary embodiment.

When there are links for synchronous transmission, the corresponding clocks of multiple links can be in the form of FIG. 8, that is, the timestamps of link 1 and link 2 of synchronous transmission are the same. In this case, one timestamp can be omitted and only one is saved. The identifiers of link 1 and link 2 both correspond to the timestamp.

Optionally, the identifier of the link includes a first group of consecutive bits and a second group of consecutive bits, the first group of consecutive bits represents the number of the link, and the second group of consecutive bits represents the bandwidth of the link.

In this implementation, with the identifier of the link in this manner, it can ensure the normal distinction of each link. For example, an 8-bit identifier may be used, wherein the upper 2 bits represent the number of the link, and the lower 6 bits represent the bandwidth of the link.

Figure 9:
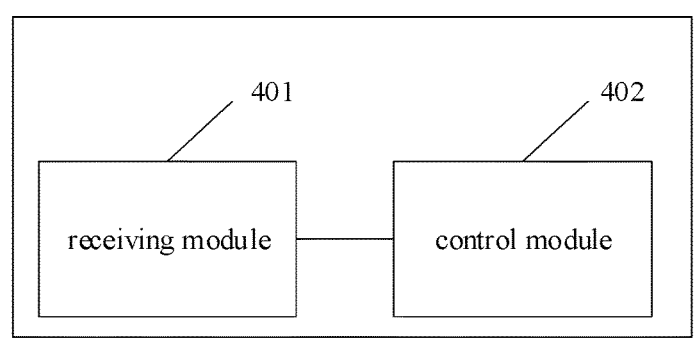
FIG. 9 is a block diagram of an apparatus for time synchronization according to an exemplary embodiment.

FIG. 9 is a block diagram of an apparatus for time synchronization according to an exemplary embodiment. The apparatus has the function of implementing the terminal in the above method embodiments, and the function may be realized by hardware, or by executing corresponding software in hardware. As shown in FIG. 9, the apparatus includes: a receiving module 401 and a control module 402.

The receiving module 401 is configured to receive a message carrying time synchronization function information, and the time synchronization function information is configured for time synchronization between a station and an access point under multiple links. The control module 402 is configured to control the time synchronization between the station and the access point under multiple links by using the time synchronization function information.

Optionally, the time synchronization function information includes multiple timestamps corresponding to multiple links respectively.

Optionally, the control module 402 is configured to, in response to a first link and the second link in the plurality of links performing information transmission in an asynchronous transmission mode, control the time synchronization between the station and the access point under the first link and the second link respectively by using two timestamps corresponding to the first link and the second link in the time synchronization function information.

Optionally, the control module 402 is further configured to, in response to a third link and a fourth link in the plurality of links performing information transmission in a synchronous transmission mode, control the time synchronization between the station and the access point under the third link and the fourth link by using the timestamp used in a process of associating the station with the access point.

Optionally, the control module 402 is configured to update clocks corresponding to the plurality of links by using the time synchronization function information.

Optionally, the clocks corresponding to the plurality of links includes:

identifiers and corresponding timestamps of respective links in the plurality of links.

Optionally, the identifier of the link includes a first group of consecutive bits and a second group of consecutive bits, the first group of consecutive bits represents a number of the link, and the second group of consecutive bits represents a bandwidth of the link.

Optionally, the receiving module 401 is configured to receive a beacon frame or a probe response frame, and the beacon frame or the probe response frame carries the message.

Figure 10:
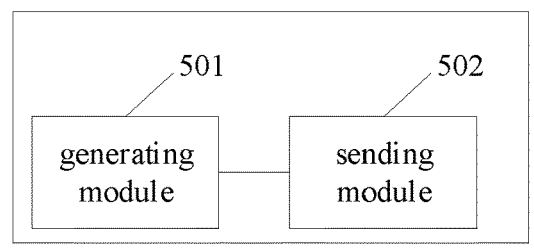
FIG. 10 is a block diagram of an apparatus for time synchronization according to an exemplary embodiment.

FIG. 10 is a block diagram of an apparatus for time synchronization according to an exemplary embodiment. The apparatus has the function of implementing the access point device in the above method embodiments, and the function may be implemented by hardware, or by executing corresponding software in hardware. As shown in FIG. 10, the apparatus includes: a generating module 501 and a sending module 502.

The generating module 501 is configured to generate a message carrying time synchronization function information, and the time synchronization function information is configured for time synchronization between a station and an access point under multiple links. The sending module 502 is configured to send the message.

Optionally, the sending module 502 is configured to send a beacon frame or a probe response frame, and the beacon frame or the probe response frame carries the message.

Figure 11:
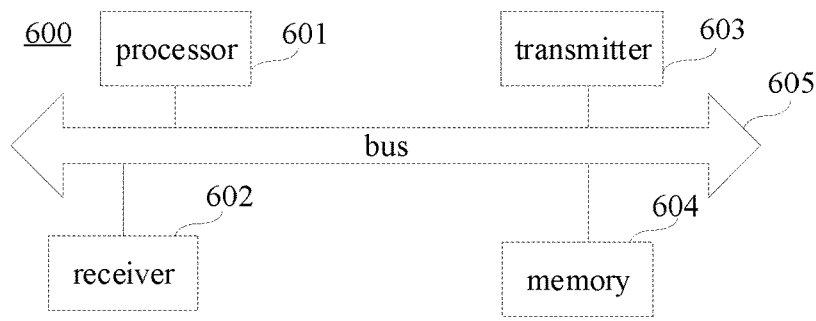
FIG. 11 is a block diagram of a terminal according to an exemplary embodiment.

FIG. 11 is a block diagram of a terminal 600 according to an exemplary embodiment. The terminal 600 may include: a processor 601, a receiver 602, a transmitter 603, a memory 604 and a bus 605.

The processor 601 includes one or more processing cores, and the processor 601 executes various functional applications and information processing by running software programs and modules.

The receiver 602 and the transmitter 603 may be implemented as a communication component, which may be a communication chip.

The memory 604 is connected to the processor 601 through the bus 605.

The memory 604 may be configured to store at least one instruction, and the processor 601 may be configured to execute the at least one instruction to implement various steps in the above method embodiments.

Furthermore, the memory 604 may be implemented by any type or combination of volatile or non-volatile storage devices including, but not limited to, magnetic or optical disks, Electrically Erasable Programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an exemplary embodiment, a computer readable storage medium is also provided, wherein the computer readable storage medium stores at least one instruction, at least one piece of program, code set or instruction set, and the at least one instruction, the at least one piece of program, the code set or the instruction set is loaded and executed by the processor to implement the method for time synchronization provided by each of the above method embodiments.

Figure 12:
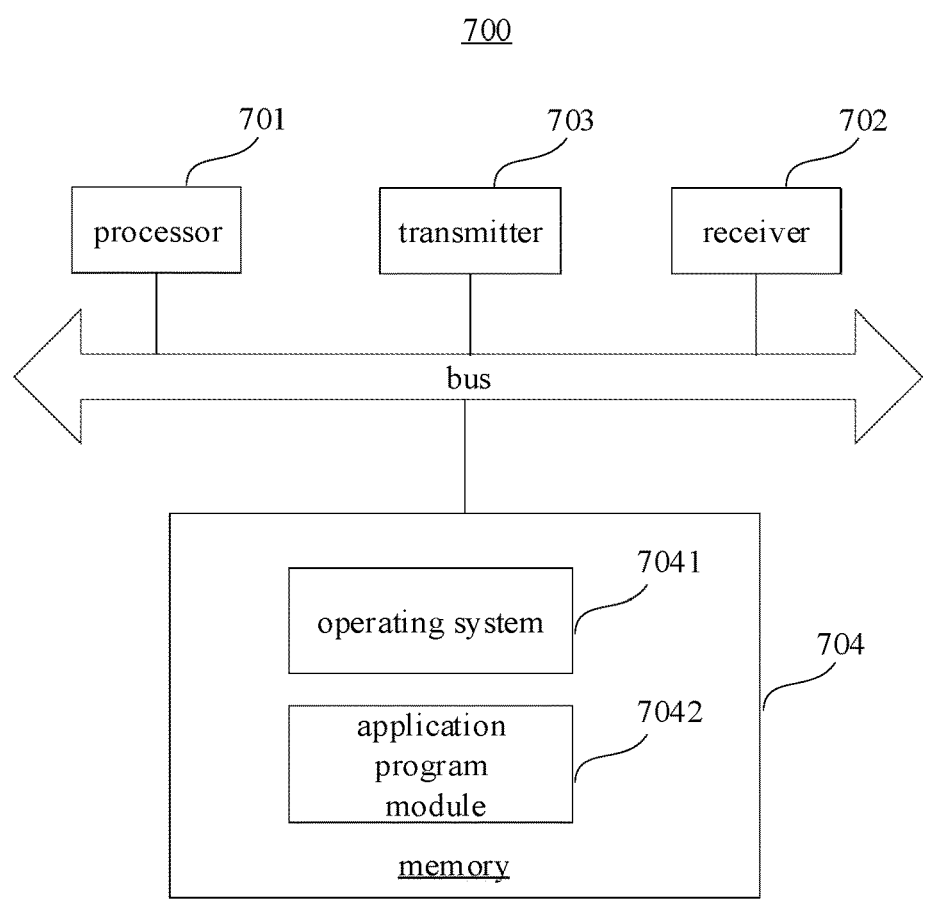
FIG. 12 is a block diagram of an access point device according to an exemplary embodiment.

FIG. 12 is a block diagram of an access point device 700 according to an exemplary embodiment. The access point device 700 may include: a processor 701, a receiver 702, a transmitter 703 and a memory 704. The receiver 702, the transmitter 703 and the memory 704 are respectively connected to the processor 701 through a bus.

The processor 701 includes one or more processing cores, and the processor 701 executes the method performed by the access point device in the method for time synchronization provided by the embodiments of the present disclosure by running software programs and modules. The memory 704 may be configured to store software programs and modules. Specifically, the memory 704 may store an operating system 7041 and an application program module 7042 required for at least one function. The receiver 702 is configured to receive communication data sent by other devices, and the transmitter 703 is configured to send communication data to other devices.

In an exemplary embodiment, a computer readable storage medium is also provided, wherein the computer readable storage medium stores at least one instruction, at least one piece of program, code set or instruction set, and the at least one instruction, the at least one piece of program, the code set or the instruction set is loaded and executed by the processor to implement the method for time synchronization provided by each of the above method embodiments.

An exemplary embodiment of the present disclosure also provides a system for time synchronization, where the system includes a terminal and an access point device. The terminal is the terminal provided by the embodiment shown in FIG. 11. The access point device is the access point device provided in the embodiment shown in FIG. 12.

Other embodiments of the present disclosure will readily occur to those skilled in the art upon consideration of the specification and practice of the disclosure disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for time synchronization, comprising:
receiving, by a terminal, a message carrying time synchronization function information, wherein the time synchronization function information is configured for time synchronization between a station and an access point under a plurality of links;
controlling, by the terminal, the time synchronization between the station and the access point under the plurality of links by using the time synchronization function information; wherein the time synchronization function information comprises a plurality of timestamps respectively corresponding to the plurality of links;
wherein controlling the time synchronization between the station and the access point under the plurality of links by using the time synchronization function information comprises:
controlling, by the terminal, the time synchronization between the station and the access point under a first link and a second link respectively by using two timestamps corresponding to the first link and the second link in the time synchronization function information, in response to the first link and the second link in the plurality of links performing information transmission in an asynchronous transmission mode; and
controlling, by the terminal, the time synchronization between the station and the access point under a third link and a fourth link by using a timestamp used in a process of associating the station with the access point, in response to the third link and the fourth link in the plurality of links performing information transmission in a synchronous transmission mode.

2. The method according to claim 1, wherein controlling the time synchronization between the station and the access point under the plurality of links by using the time synchronization function information comprises:
updating clocks corresponding to the plurality of links by using the time synchronization function information.

3. The method according to claim 2, wherein the clocks corresponding to the plurality of links comprise:
identifiers and corresponding timestamps of respective links in the plurality of links.

4. The method according to claim 3, wherein each of the identifier of the respective links comprises a first group of consecutive bits and a second group of consecutive bits, the first group of consecutive bits represents a number of the link, and the second group of consecutive bits represents a bandwidth of the link.

5. The method according to claim 1, wherein receiving the message carrying time synchronization function information comprises:
receiving a beacon frame or a probe response frame, wherein the beacon frame or the probe response frame carries the message.

6. A method for time synchronization, comprising:
generating, by an access point device, a message carrying time synchronization function information, wherein the time synchronization function information is configured for time synchronization between a station and an access point under a plurality of links; and
sending, by the access point device, the message; wherein the time synchronization function information comprises a plurality of timestamps respectively corresponding to the plurality of links and is configured for a terminal to:
control the time synchronization between the station and the access point under a first link and a second link respectively by using two timestamps corresponding to the first link and the second link in the time synchronization function information, in response to the first link and the second link in the plurality of links performing information transmission in an asynchronous transmission mode; and
control the time synchronization between the station and the access point under a third link and a fourth link by using a timestamp used in a process of associating the station with the access point, in response to the third link and the fourth link in the plurality of links performing information transmission in a synchronous transmission mode.

7. The method according to claim 6, wherein sending the message comprises:
sending a beacon frame or a probe response frame, wherein the beacon frame or the probe response frame carries the message.

8. A terminal, comprising:
a processor; and
a memory, configured to store instructions executable by the processor, wherein the processor is configured to:

receive a message carrying time synchronization function information, wherein the time synchronization function information is configured for time synchronization between a station and an access point under a plurality of links;

control the time synchronization between the station and the access point under the plurality of links by using the time synchronization function information; wherein the time synchronization function information comprises a plurality of timestamps respectively corresponding to the plurality of links;

wherein when the processor controls the time synchronization between the station and the access point under the plurality of links by using the time synchronization function information, the processor is configured to:

control the time synchronization between the station and the access point under a first link and a second link respectively by using two timestamps corresponding to the first link and the second link in the time synchronization function information, in response to the first link and the second link in the plurality of links performing information transmission in an asynchronous transmission mode; and control the time synchronization between the station and the access point under a third link and a fourth link by using a timestamp used in a process of associating the station with the access point, in response to the third link and the fourth link in the plurality of links performing information transmission in a synchronous transmission mode.

9. The terminal according to claim 8, wherein the processor is configured to:
update clocks corresponding to the plurality of links by using the time synchronization function information.

10. The terminal according to claim 9, wherein the clocks corresponding to the plurality of links comprise:
identifiers and corresponding timestamps of respective links in the plurality of links.

11. The terminal according to claim 10, wherein each of the identifier of the respective links comprises a first group of consecutive bits and a second group of consecutive bits, the first group of consecutive bits represents a number of the link, and the second group of consecutive bits represents a bandwidth of the link.

12. The terminal according to claim 8, wherein the processor is configured to:
receive a beacon frame or a probe response frame, wherein the beacon frame or the probe response frame carries the message.

* * * * *